June 15, 1926.
F. R. JONES
CUT-OFF FOR GRAVEL BINS AND CHUTES
Filed July 25, 1925
1,588,838
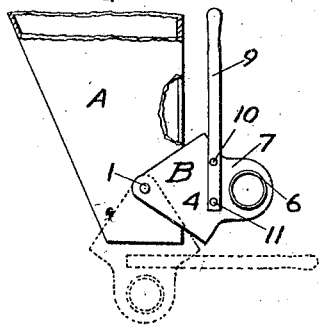
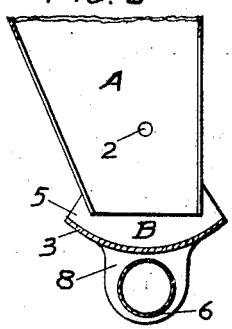
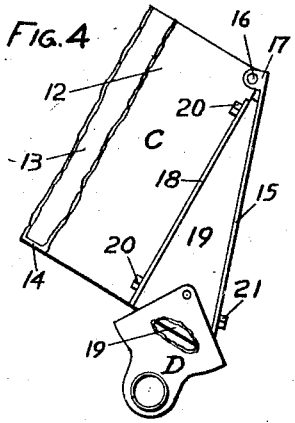
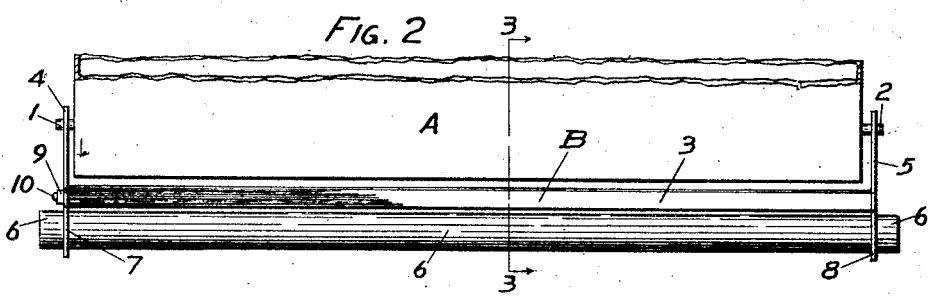
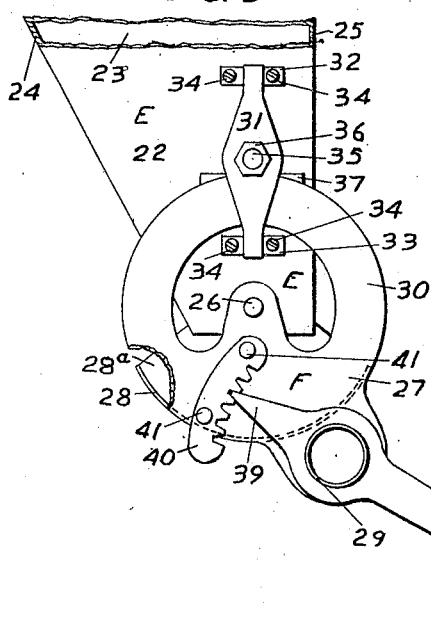
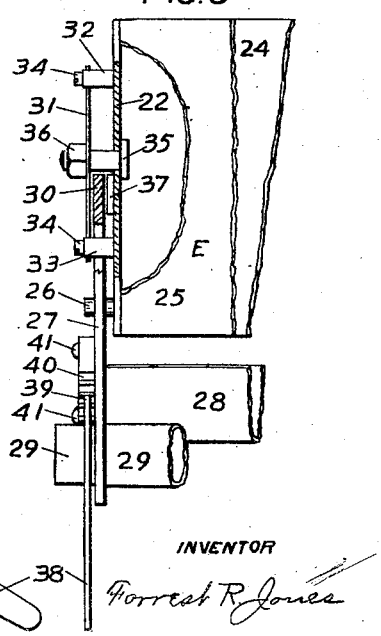
INVENTOR
Forrest R. Jones Patented June 15, 1926.

1,588,838

UNITED STATES PATENT OFFICE.

FORREST R. JONES, OF KNOXVILLE, TENNESSEE.

CUT-OFF FOR GRAVEL BINS AND CHUTES.

Application filed July 25, 1925. Serial No. 46,134.

My invention relates to cutoffs of the type having a trough for retaining materials of the nature of gravel and sand in a bin, a chute, the tiltable body of a dump-truck and other similar containers, and for controlling the flow of material therefrom.

The objects of the invention are: first, to provide a cutoff having a long trough and sufficiently rigid to resist twisting to a noticeable extent; second, to afford facilities for locking the cutoff in each of its operative positions; and, third, to furnish means by the use of which an operating handle can be set in different positions, each suitable for a corresponding operator.

I attain these objects by the mechanism illustrated in the accompanying drawings, of which—

Fig. 1 is a side elevation of the lower part of a hopper and of a nonclosing cutoff represented in its discharge position by solid lines, and in its retaining position by dotted lines; part of one wall-plate is broken away to show the rear wall-plate of the hopper; Fig. 2 is a rear elevation of the hopper of Fig. 1, and of the cutoff in its retaining position; Fig. 3 is a cross-section on the plane 3—3 of Fig. 2; Fig. 4 is a side elevation of the lower part of a hopper with an ordinary discharge-gate and the nonclosing cutoff mechanism; Fig. 5 is a side elevation of a hopper with mechanism for locking the cutoff, and means for adjusting the operating handle; Fig. 6 is a rear elevation of the locking and adjusting mechanisms of Fig. 5, together with one end of the cutoff and the corresponding adjacent parts, the remainder being broken away.

Referring to Figs. 1, 2 and 3, the hopper A has hinge-pins 1 and 2 which carry a nonclosing cutoff B. This cutoff is composed of a trough 3, end-plates 4 and 5, and a torque-tube 6, all rigidly fastened together by welding. The torque-tube 6 fits into a hole through an extension 7 of the end-plate 4, and likewise into an extension 8 of the end-plate 5. The torque-tube 6 is welded to both of the end-plates, as is the trough 3. A handle 9, for operating the cutoff, is rigidly fastened to the end-plate 4 by rivets 10 and 11. When the discharge rate is not of importance the trough can be satisfactorily tilted under a load of some kinds of roadway material by grasping and pulling on the torque-tube, and uprighting the cutoff is readily done by pushing by hand on the cutoff.

The chief function of the torque-tube 6 is to provide rigidity against twisting of the cutoff about the axis of its hinge-pins. A second function of the torque-tube is to support the trough of the cutoff against sagging. Although, for clearness of illustration, the torque-tube is shown at an appreciable distance from the trough, the construction can be such that there is contact between the torque-tube and the trough throughout the length of the latter.

A nonclosing cutoff like that of Figs. 1, 2 and 3, including the torque-tube and end-plate handle, operates satisfactorily in a size that has a trough seven feet long and the other members proportioned substantially as shown. The trough does not twist noticeably even when handling sharp loose stone; but if the torque-tube is omitted or removed, then the same cutoff twists enough to discharge a stream of considerable thickness next to the handle while the far end of the trough remains in its retaining position. Actual tryouts of a seven-foot cutoff have shown this action.

In Fig. 4 is shown a hopper C comprising side-walls 12 and 13 together with a bottom-plate 14 and an ordinary discharge-gate 15 shown in partly open position and hinged at the top to the side-wall 12 by an hinge-pin 16 and a hinge member 17. The discharge-gate 15 extends from side-wall to side-wall of the hopper and is hinged to the side-wall 13 in the same manner as to the side-wall 12. The side-wall 12 has an external flange 18. Between the discharge-gate 15 and the flange 18 is a wedge-shaped spacer-plate 19 fastened to the flange 18 of side-wall 12 by cap-bolts 20, 20, and to the discharge-gate 15 by a cap-bolt 21. The side-wall 13 is also externally flanged like side-wall 12, and a spacer-plate is similarly fastened to the flange of side-wall 13 and to the discharge-gate 15. An outlet opening is thus left in the lower part of the hopper between the ordinary discharge-gate 15 and adjacent edge of the bottom-plate 14. Beneath this outlet is a nonclosing cutoff D like the cutoff B of Figs. 1, 2 and 3 and similarly hinged to the walls of the outlet opening. Part of the cutoff D in Fig. 4 is broken away to show the lower end of the spacer-plate 19.

In Figs. 5 and 6 is shown the lower part of a hopper E composed of the wall-plates 22, 23, 24 and 25. A hinge-pin 26 in the wall-plate 22 carries a modified end-plate 27 of a nonclosing cutoff F whose trough 28, torque-tube 29, and unmodified end-plate 28ª, are each respectively similar to those shown earlier herein. Part of the end-plate 27 is broken away to show some of the end of the trough 28.

The end-plate 27 has an upward extension 30 whose form is that of a ring which is thin in a direction parallel to its axis. Part of this extension 30 is broken away in Fig. 6. A clamp 31 extends across the ring-shaped extension 30 and fits into a notch in each of the blocks 32 and 33 fastened to the wall-plate 22 by screws 34. A clamp-bolt 35 through the clamp 31 and wall-plate 22 has a nut 36 which, when tightened, causes the ring-shaped extension 30 to be gripped between the clamp 31 and a friction-plate 37 rigidly fastened to the wall-plate 22 as by brazing, and this frictional grip locks the cutoff against swinging on its hinge-pins.

An adjustable handle 38 fits freely on one of the projecting ends of the torque-tube 29 and has a tapered extension 39 fitting into one of the notches of a curved member 40 fastened to the end-plate 27 by rivets 41, 41. The handle 38 can be set to different positions by moving its extended end 39 from one notch to another of the curved member 40.

Each of the cutoffs can be operated by an ordinary tool such as a monkey wrench or the mechanical dog commonly used by sheet-metal workers and blacksmiths. When such a tool is gripped on the edge of the cutoff trough it serves as a handle for operating the cutoff.

I claim:

1. The combination of a hopper, an outlet in the lower part of the hopper, a nonclosing cutoff to retain material in the hopper and control flow from the outlet, and a torque-tube fastened to the ends of the cutoff.

2. The combination of a hopper, an outlet in the lower part of the hopper, a nonclosing cutoff to retain material in the hopper and control flow from the outlet, and a torque-tube fastened to the ends of the cutoff and close to the under side of the cutoff to prevent both twist and sag thereof.

3. The combination of a hopper, an outlet in the lower part of the hopper, a nonclosing cutoff to retain material in the hopper and control flow from the outlet, an upward extension of one of the end-plates of the cutoff, and means to clamp the upward extension so as to lock the cutoff in each of its operative positions relative to the outlet.

4. The combination of a hopper, an outlet in the lower part of the hopper, a cutoff to retain material in the hopper and control flow from the outlet, a torque-tube fastened to the ends of the cutoff, and a handle mounted freely on the torque-tube but locked against rotation thereon by engagement with the teeth of a notched bar on the end-plate of the cutoff.

FORREST R. JONES.